(12) United States Patent
Baracaldo-Angel et al.

(10) Patent No.: US 10,241,826 B2
(45) Date of Patent: *Mar. 26, 2019

(54) SEMANTIC-AWARE AND USER-AWARE ADMISSION CONTROL FOR PERFORMANCE MANAGEMENT IN DATA ANALYTICS AND DATA STORAGE SYSTEMS

(71) Applicant: International Business Machines Corporation, Armonk, NY (US)

(72) Inventors: Nathalie Baracaldo-Angel, Pittsburgh, PA (US); Heiko H. Ludwig, San Francisco, CA (US); William W. Owen, Tucson, AZ (US); Rui Zhang, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/792,643

(22) Filed: Oct. 24, 2017

(65) Prior Publication Data

US 2018/0046493 A1 Feb. 15, 2018

Related U.S. Application Data

(63) Continuation of application No. 14/869,798, filed on Sep. 29, 2015, now Pat. No. 9,870,251.

(51) Int. Cl.
  *G06F 9/46* (2006.01)
  *G06F 9/48* (2006.01)

(52) U.S. Cl.
  CPC .............. *G06F 9/46* (2013.01); *G06F 9/4843* (2013.01)

(58) Field of Classification Search
  None
  See application file for complete search history.

(56) References Cited

U.S. PATENT DOCUMENTS

| 8,762,525 | B2 | 6/2014 | Devarakonda et al. |
| 8,789,060 | B1 | 7/2014 | Wadland et al. |
| 9,870,251 | B2 | 1/2018 | Baracaldo Angel et al. |
| 2007/0055771 | A1 | 3/2007 | Tantawi et al. |

(Continued)

OTHER PUBLICATIONS

List of IBM Patents Or Patent Applications Treated As Related.
(Continued)

*Primary Examiner* — Gregory A Kessler
(74) *Attorney, Agent, or Firm* — Zilka-Kotab, P.C.

(57) ABSTRACT

In one embodiment, a computer program product includes a computer-readable storage medium having program instructions embodied therewith. The embodied program instructions are executable by a processor to cause the processor to receive, by the processor, a first job request. The embodied program instructions are also executable by the processor to cause the processor to analyze, by the processor, the first job request to determine a user skill level of a user that submitted the first job request. Moreover, the embodied program instructions are executable by the processor to cause the processor to admit, by the processor, the first job request to a data analytics system and/or a data storage system in a specified order with respect to other received job requests based on at least the user skill level of the user that submitted the first job request. Other systems and methods are described in accordance with more embodiments.

20 Claims, 7 Drawing Sheets

(56) References Cited

U.S. PATENT DOCUMENTS

| | | |
|---|---|---|
| 2007/0083500 A1 | 4/2007 | Zibitsker |
| 2008/0244584 A1 | 10/2008 | Smith et al. |
| 2009/0119670 A1 | 5/2009 | Yamada et al. |
| 2010/0198807 A1 | 8/2010 | Kuno et al. |
| 2013/0091506 A1 | 4/2013 | Boris |
| 2017/0090975 A1 | 3/2017 | Baracaldo Angel et al. |

OTHER PUBLICATIONS

Corrected Notice of Allowance from U.S. Appl. No. 14/869,798, dated Nov. 27, 2017.

Chiu et al., "Performance Analysis of a Multiprogrammed Computer System," IP.com Prior Art Database Technical Disclosure, Mar. 30, 2007, pp. 1-43.

Woodbury et al., "Performance Modeling of Real-Time Multiprocessors with Time-Shared Buses," IP.com Prior Art Database Technical Disclosure, Nov. 1, 1984, pp. 1-16.

Angel et al., U.S. Appl. No. 14/869,798, filed Sep. 29, 2015.

Dan et al., "Web services on demand: WSLA-driven automated management," IBM Systems Journal, vol. 43, No. 1, 2004, pp. 136-158.

Bhuyan et al., "Detecting Distributed Denial of Service Attacks: Methods, Tools and Future Directions," The Computer Journal, 2013, pp. 1-20.

Blasing et al., "An Android Application Sandbox System for Suspicious Software Detection," 5th International Conference on Malicious and Unwanted Software, IEEE, 2010, pp. 55-62.

Chaudhuri, S., "An Overview of Query Optimization in Relational Systems," ACM Symposium on Principles of Database Systems, 1998, pp. 34-43.

Karve et al., "Dynamic placement for clustered web applications," 15th international conference on World Wide Web, ACM, May 2006, pp. 1-10.

Non-Final Office Action from U.S. Appl. No. 14/869,798, dated May 1, 2017.

Ex Parte Quayle from U.S. Appl. No. 14/869,798, dated Aug. 8, 2017.

Notice of Allowance from U.S. Appl. No. 14/869,798, dated Sep. 12, 2017.

SEMANTIC-AWARE AND USER-AWARE ADMISSION CONTROL FOR PERFORMANCE MANAGEMENT IN DATA ANALYTICS AND DATA STORAGE SYSTEMS

BACKGROUND

The present invention relates to improving performance in data analytics and data storage environments, and more particularly, this invention relates to semantic- and user-aware admission control for performance management in data analytics and data storage environments.

Big data is a term which is used to describe, generally, data sets that are so large and/or complex that conventional data storage retrieval and/or analytics processes are inadequate and/or inefficient at manipulating the data sets. Most types of access and/or analytics may be hindered by the size of the data sets, including, but not limited to, analyzing, capturing, searching, sharing, storing, transferring, copying, and privacy. The term may also refer to extracting value from large amounts of data. In order to extract this value, the data must be stored and accessible within a big data environment, such as a distributed storage system.

In conventional big data environments, a plurality of local and/or remote storage devices are used to store large amounts of data. Some exemplary big data environments include, but are not limited to, distributed data storage systems, server farms, data centers, cloud environments, Hadoop environments, etc. Many of these big data environments are also capable of analyzing large amounts of data, that may be spread out across many storage devices. These big data environments receive many access requests for access to the data that is stored thereto. In some instances, the big data environments may receive analytics requests for analytics to be performed on data stored thereto. A data analytics platform, such as Hadoop, Spark, etc., may be deployed in the big data environment to perform data analytics on the data stored therein. A data analytics application may be run on top of the platform.

There are two broad categories of approaches to performance management in big data environments, specifically distributed storage systems: (a) quality of service control and resource allocation conducted to jobs after they have entered the system, and (b) admission control on jobs before they enter the system. However, conventional admission control routines are limited in their functionality to ensuring that a requester is authorized to access data that is being requested, and ensuring that the request will not expose the data and/or the big data environment to a security breach.

SUMMARY

In one embodiment, a computer program product includes a computer-readable storage medium having program instructions embodied therewith. The embodied program instructions are executable by a processor to cause the processor to receive, by the processor, a first job request. The embodied program instructions are also executable by the processor to analyze, by the processor, the first job request to determine: an estimated complexity of the first job request based on one or more attributes of the first job request and a user skill level of a user that submitted the first job request. Moreover, the embodied program instructions are executable by the processor to admit, by the processor, the first job request to a data analytics system and/or a data storage system in a specified order with respect to other received job requests based on at least: the estimated complexity of the first job request, and the user skill level of the user that submitted the first job request.

In another embodiment, a computer-implemented method includes receiving a first job request and analyzing the first job request to determine a user skill level of a user that submitted the first job request. Moreover, the method includes admitting the first job request to a data analytics system and/or a data storage system in a specified order with respect to other received job requests based on at least the user skill level of the user that submitted the first job request.

According to another embodiment, a system includes a job request analyzer module configured to analyze a job request to determine a user skill level of a user that submitted the job request. Also, the system includes a job dispatcher module configured to admit the job request to a data analytics system and/or a data storage system in a specified order with respect to other received job requests based on the user skill level of the user that submitted the job request.

Other aspects and embodiments of the present invention will become apparent from the following detailed description, which, when taken in conjunction with the drawings, illustrate by way of example the principles of the invention.

DETAILED DESCRIPTION

Figure 1:
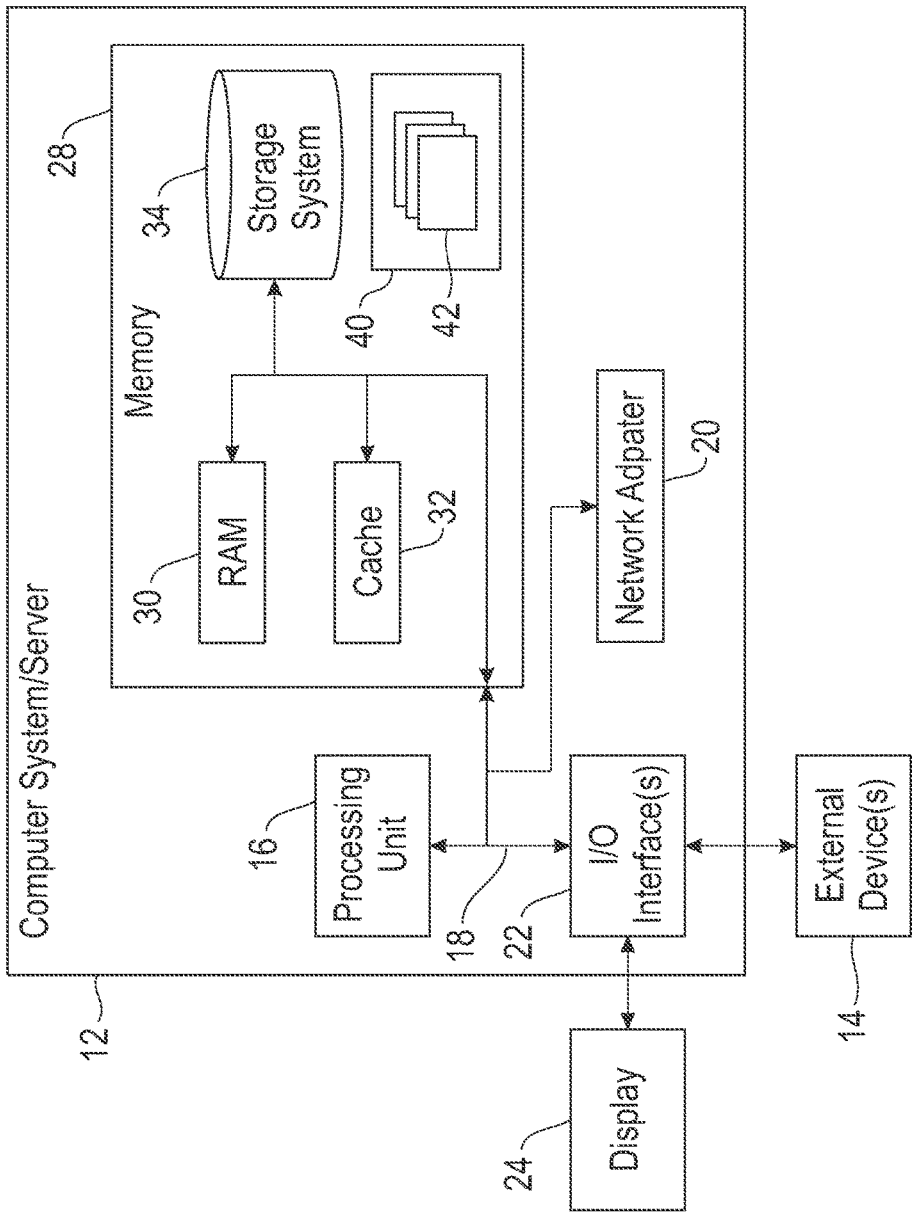
FIG. 1 depicts a cloud computing node according to an embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of semantic- and user-aware admission control for performance management in data analytics and/or data storage environments.

In one general embodiment, a computer program product includes a computer-readable storage medium having program instructions embodied therewith. The embodied program instructions are executable by a processor to cause the processor to receive, by the processor, a first job request. The embodied program instructions are also executable by the processor to analyze, by the processor, the first job request to determine: an estimated complexity of the first job request based on one or more attributes of the first job request and a user skill level of a user that submitted the first job request. Moreover, the embodied program instructions are executable by the processor to admit, by the processor, the first job request to a data analytics system and/or a data storage system in a specified order with respect to other received job requests based on at least: the estimated complexity of the first job request, and the user skill level of the user that submitted the first job request.

In another general embodiment, a system includes a job request analyzer module configured to analyze a job request to determine: an estimated complexity of the first job request based on one or more attributes of the first job request and a user skill level of a user that submitted the first job request. The system also includes a plurality of queues, each queue being configured to store job requests having different estimated complexities and user skill levels with respect to job requests stored in other queues. Moreover, the system includes a classification module configured to temporarily store the job request into one of the plurality of queues based on the estimated complexity of the job request and the user skill level of the user that submitted the job request. In addition, the system includes a job dispatcher module configured to admit the job request to a data analytics system and/or a data storage system in a specified order with respect to other received job requests based on a queue in which the job request is stored.

According to another general embodiment, a computer-implemented method includes receiving a first job request and temporarily storing, by a processor, the first job request in a first queue of a plurality of queues based on an estimated complexity of the first job request and a user skill level of a user that submitted the first job request. The method also includes admitting, by the processor, the first job request from the first queue to a data analytics system and/or a data storage system to be processed. The first job request is selected in a specified order with respect to other received job requests stored in other queues based on the estimated complexity of the first job request, and the user skill level of the user that submitted the first job request. The estimated complexity is based on one or more attributes of the first job request. Also, the user skill level is based on factors selected from the group including: user experience level, user job request submission history, and corresponding data analytics system and/or data storage system response history to the user job request submission history.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
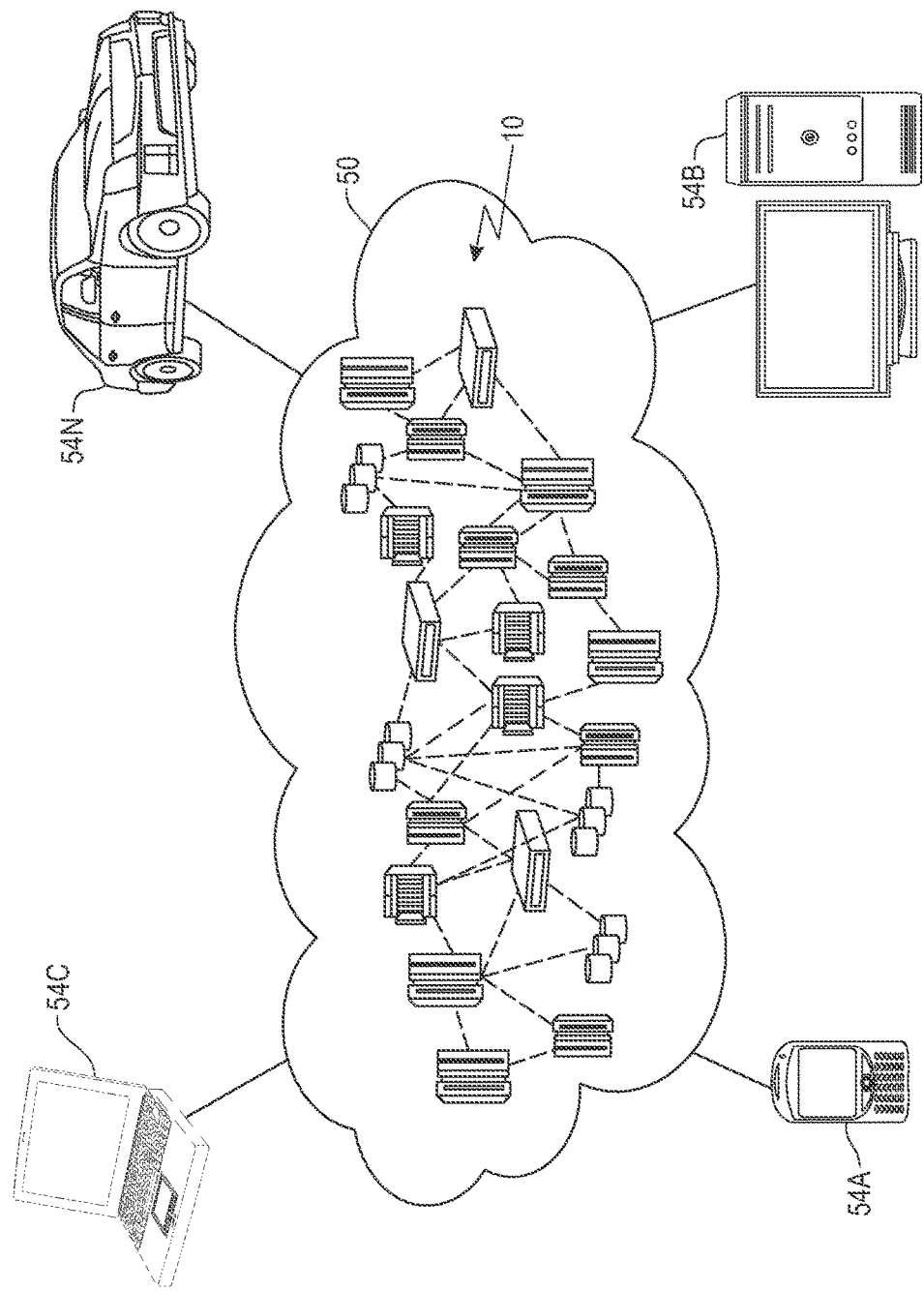
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
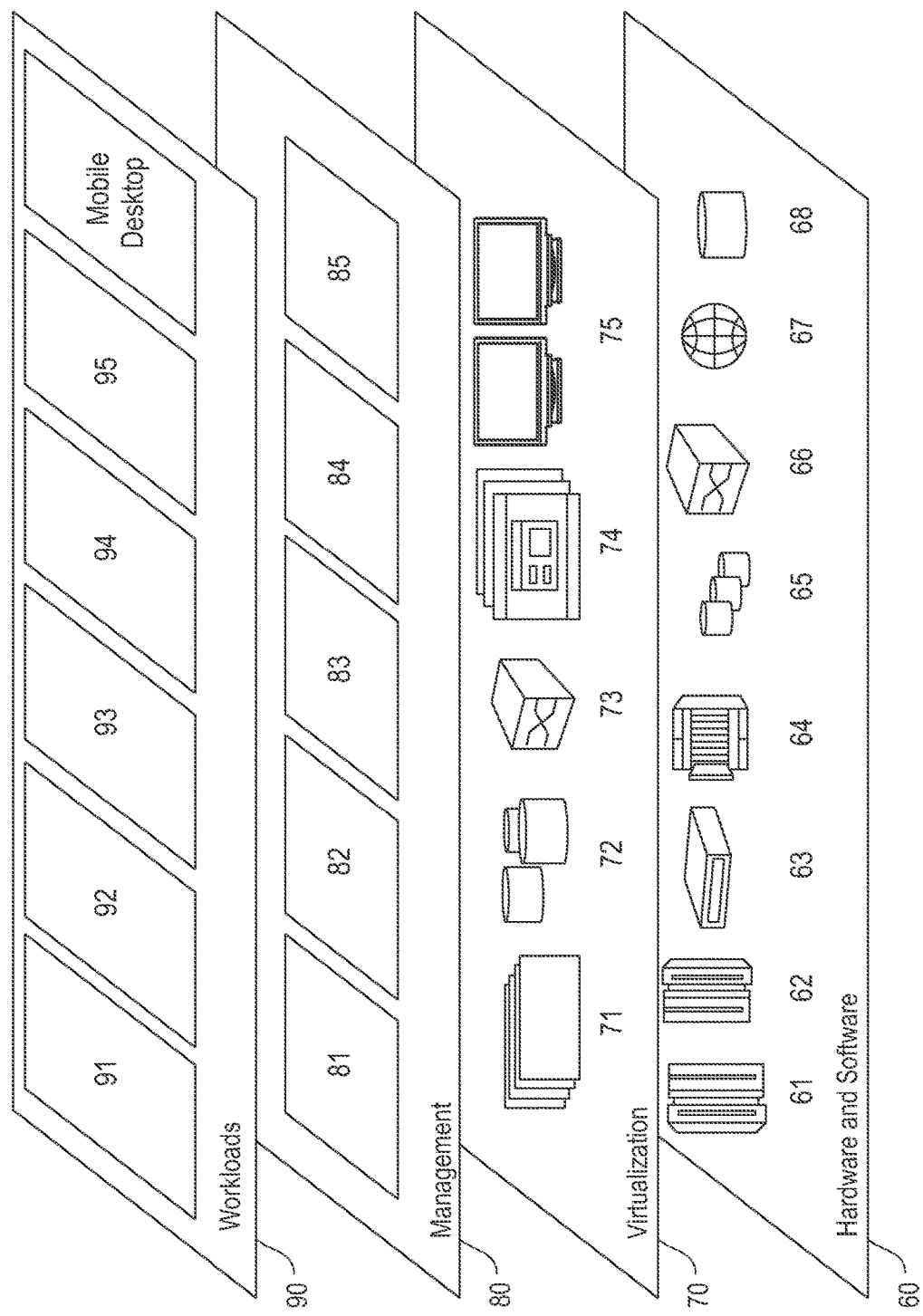
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Further, the management layer 80 may include logic for vertically tuning distributed analytics clusters.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Figure 4:
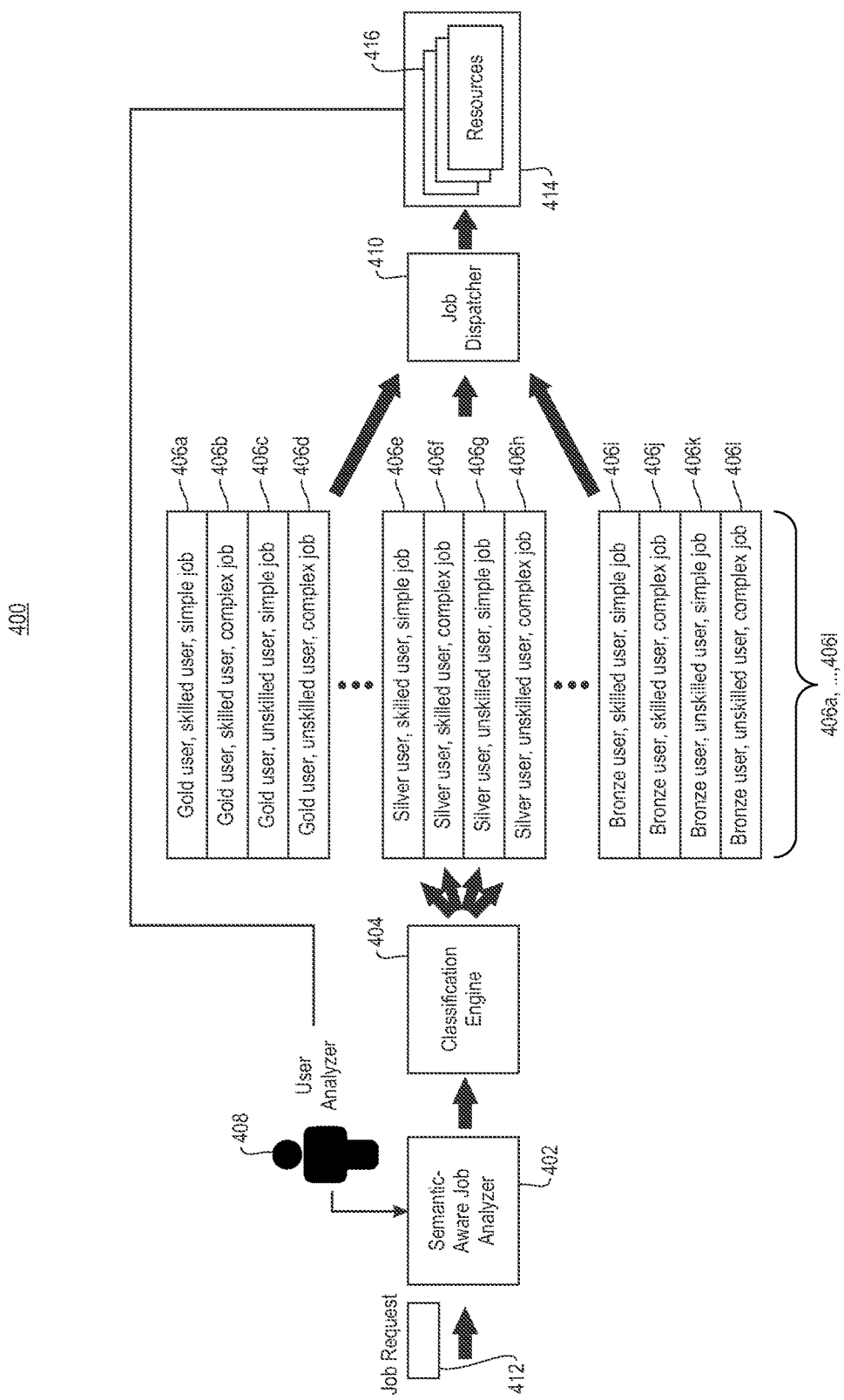
FIG. 4 depicts a semantic-aware admission control system, in accordance with one embodiment.

FIG. 4 depicts a semantic-aware admission control system 400, in accordance with one embodiment. The admission control system 400 comprises a job request analyzer module 402, a classification module 404, a plurality of queues 406a, ..., 406l, an optional user analyzer 408, and a job dispatcher module 410. The admission control system 400 is configured to receive one or more job requests 412, such as from one or more hosts, servers, etc. The job request 412 specifies some amount of data to access (an access may include any known operation on data, including but not limited to read, write, delete, copy, etc.). In some instances, the job request 412 may include a request to perform analytics on the data that is being accessed, such as searching for a keyword or term, computing word totals, calculating a total number of rows of an array, calculating a total number of columns of an array, complex operations (e.g., merge, sort, join), etc.

The job request analyzer module 402 is configured to analyze a job request 412 that has been received by the admission control system 400 in order to determine an estimated complexity of the job request 412 based on one or more attributes of the job request.

In one embodiment, the job request analyzer module 402 may be configured to analyze semantics of the job request 412 to determine a size of the job request 412 and identify the user that submitted the job request 412, such as via the user analyzer 408, or with logic integrated into the job request analyzer module 402 configured for identification of a user that submitted the job request 412.

To identify the user, one or more user attributes may be used, e.g., by the job request analyzer module 402 and/or the user analyzer 408. The attributes may include any useful information about the user, about the user's behavior in the past, about the company or organization in which the user is associated, etc. The attributes may be used to develop a user profile that encapsulates the attributes of the user in a normalized and comparable way with other user profiles. Some exemplary attributes include, but are not limited to, name of organization associated with the user, user name, level of service provided for and/or paid for by the user and/or organization (some users may pay money on a recurring or one-off basis to have their job request(s) admitted faster than other job requests of the same type), etc.

The size of the job request 412 may be determined based on a size of data sets for which the job request has requested access. Furthermore, the job request analyzer module 402 may determine an estimated complexity of the job request 412 based on inexpensive scanning (in terms of processing power and time required to perform the scanning) to enable pattern and/or signature identification. In order to determine estimated complexity, the job request analyzer module 402 may identify one or more patterns in the job request 412.

The patterns that are searched for and identified in the job request 412 each imply a complex operation within the job request 412. These patterns may constitute a signature that indicates that a complex operation may be called by the job request 412, without extensive searching and analyzing of the job request, that would slow down the performance of the data analytics and/or data storage systems 414 to which the job requests are admitted. A data storage system may be a cloud computing storage system, a distributed storage system comprising a plurality of remotely accessible storage clusters, or some other data storage system known in the art. A data analytics system may be a Hadoop analytics system, a Spark analytics system, or some other data analytics system known in the art.

Pattern and/or signature identification may be based on semantics of the job request 412, including, but not limited to, keywords in the job request 412, a combination of keywords in the job request 412, a pattern of keywords in the job request 412, data set sizes of data sets referenced in the job request 412, etc. The estimated complexity of the job request 412 is higher when more patterns within the job request 412 are identified relative to the estimated complexity of the job request 412 when less or no patterns within the job request 412 are identified.

In addition, a high requirement dictionary or reference set may be used to determine which phrases, commands, and/or code strings are likely to require complex operations. The high requirement dictionary may include words and phrases that are likely to trigger complex operations in a job request, and may include common and/or shared library commands, such as from internet-accessible repositories, locally-shared command structures, etc.

Furthermore, the larger the data set sizes, the more data must be copied, searched through, and/or manipulated depending on the specific analytics that are to be performed on the data set. This results in utilizing more resources 416 of the data analytics and/or data storage systems 414, and/or a more complex and time consuming job request in comparison to job requests which reference smaller data sets.

According to one example, a first job request that requests access to relatively larger data sets than other job requests would imply that the first job request is more complex than the other job requests. In another example, a first job request that invokes multi-table join operations in structured query language (SQL) would involve a massive scan, and would be estimated to be more complex than other job requests that are accessing the same data, but without multi-table joins.

In yet another example, a NoSQL job request that includes nested while and for" loops has the potential for one or more infinite loops to exist in the job request. Running such a job request will unnecessarily and unproductively tie up system resources attempting to execute the job request, while being stuck in the infinite loop. According to another example, a Hadoop job request may include complex operations, such as MapReduce (batch), Spark (iterative algorithms), etc., and the inclusion of these operations in the job request may indicate a higher complexity of the job request as opposed to other job requests which do not include such operations.

The complexity of a job request may be measured relative to user performance entitlement (based on a service class of the job request, and/or a subscription level of the user or entity that submitted the job request), a current system performance state (as busy systems have lower tolerance for complex jobs, while inactive or underutilized systems will take most any job (complex or not) provided to them), a user skill level and historic usage behaviors (how well the user has performed in creation of job requests in the past, as unskilled users are more likely to submit poorly written jobs, especially when it comes to computationally complex job requests that increase the risk of worsening the system performance).

In one embodiment, the job request analyzer module 402 may be configured to classify the job request into a service class based on one or more attributes of the job request. The classification module 404 then determines which of the plurality of queues 406a, . . . , 406l, to temporarily store the job request 412 based on the service class of the job request 412 in addition to the other factors: the estimated complexity and user skill level.

The service class may be based on a current service plan to which the user and/or organization is currently enrolled (some users may pay money on a recurring or one-off basis to have their job request(s) receive higher dispatch priority than other job requests of the same type). The service class may further be based on expected resource consumption of the job request (as the expected resource consumption is increased, the service class will be correspondingly decreased), and/or a job classification policy that is set by an administrator of the data analytics and/or data storage systems 414, in various embodiments.

The plurality of queues 406a, . . . , 406l, are each configured to store job requests having different estimated complexities and user skill levels with respect to job requests stored in other queues. For example, in a three queue system, the job requests may be split into three categories, high priority, regular priority, and low priority. These classifications may be based on estimated complexity and user skill level associated with each job request stored to a respective queue, with job requests stored in the high priority queue given priority in selection for admission over job requests stored in the regular priority queue. Likewise, job requests stored in the regular priority queue are given priority in selection for admission over job requests stored in the low priority queue.

The classification module 404 is configured to temporarily store the job request 412 into one of the plurality of queues 406a, . . . , 406l, based on the estimated complexity of the job request 412 and the user skill level of the user that submitted the job request 412.

In one embodiment, the classification module 404 may be configured to drop a second job request from a queue selected to store the job request 412 in response to a determination that the queue lacks space to store the job request 412. In this case, the second job request would have a least dispatch priority with respect to all other job requests in the queue, thereby making it the least important job request in the queue, and the best candidate to drop from the queue to replace with the first job request, which has a higher dispatch priority than the second job request.

The dispatch priority of a job request is an indication of the priority of the job request to be admitted to the data analytics and/or data storage systems with respect to other job requests in the queue, and in some cases, across all the queues. Job requests having higher dispatch priorities are selected from the queue (and possibly before job requests in other queues) and admitted to the data analytics and/or data storage systems before job requests having lower dispatch priorities.

In one embodiment, each queue of the plurality of queues 406a, . . . , 406l, represents a dispatch priority, different from a dispatch priority of any other queue, and corresponds to one or more tuples. Any conceivable tuples may be used to represent the particular queues, and the tuples may include any number of values, depending on a complexity of the sorting algorithm for placing job requests into the various queues 406a, . . . , 406l. In one embodiment, the tuples may have the following dimensions: estimated complexity of the job request, service class of the job request, and user skill level. Of course, other tuples may be used, and the embodiments described herein are not limited to these specific values for the tuples.

In one embodiment, three queues may be used (denoted as gold, silver and bronze, but not so limited), with each queue split into sub-groups based on user skill level and estimated complexity of the job request. In one embodiment, job requests that are placed in the lowest and/or lower queues (e.g., bronze—unskilled user—complex job, bronze—skilled user—complex job, bronze—unskilled user—simple job, and/or bronze—skilled user—simple job) may have further analytics performed thereon to determine whether one or more of the job requests actually deserve to be placed in the lowest and/or lower queues, or whether these job requests should be moved into a higher queue in order to receive a higher dispatch priority. This determination may require more intensive and complex analytics to be performed on the job requests, and may be limited in its application to situations where excess resources are available to perform such determination. An additional analytics engine may be used to make these determinations, and/or the job request analyzer module 402.

In one embodiment, job request admission may be prioritized based on the queue in which each job request is placed. Furthermore, job admission may be effected by which queue a job request is selected, and may be tuned to enact a certain performance level for the data analytics and/or data storage system 414, in various embodiments.

In one example, for an N-tier weighted distribution (in this example, it is a 2-tier case, $W_{class} \times W_{complexity}$), the first tier weights may be set as follows: Gold 0.6, Silver 0.3, Bronze 0.1, and the second tier weights may be set as follows: Simple 0.8, Complex 0.2. This results in combined tier weights as follows: Gold-Simple 0.6×0.8=0.48, Gold-Complex 0.6×0.2=0.12, Silver-Simple 0.3×0.8=0.24, Silver-Complex 0.3×0.2=0.06, Bronze-Simple 0.1×0.8=0.08, Bronze-Complex 0.1×0.2=0.02. As can be seen from this 2-tier weighted distribution, the lower tiers will receive very little throughput, therefore many job requests in the Bronze queues may be dropped after being bumped by more recent job requests.

For a 3-tier example, assume that the third tier weights are set as follows: Heavy Usage 0.2, Medium Usage 0.6, Low Usage 0.2. In this case, the combined weights would be: Gold-Simple-Heavy 0.6×0.8×0.2=0.096, Gold-Complex-Heavy 0.6×0.2×0.2=0.024, Gold-Simple-Medium 0.6×0.8×0.6=0.288, Silver-Simple-Low 0.3×0.8×0.2=0.048, etc. Any number of tiers may be used, along with any conceivable weights being assigned to each tier, to provide an efficient admission system.

For an ordered distribution, the job requests may be selected from each queue in a re-set order, according to one embodiment. In one example, the distribution may be Gold-Simple→Gold-Complex→Silver-Simple→Silver Complex-→Bronze Simple→Bronze Complex. In another embodiment, job requests placed in Bronze Complex may be dropped automatically.

According to another embodiment, system load, from workload indicator(s), may be incorporated into the queue placement determination. In one example, during high load: Gold 0.8, Silver 0.15, Bronze 0.0, Simple 0.9, Complex 0.1. Then, during low load: Gold 0.6, Silver 0.3, Bronze 0, Simple 0.8, Complex 0.2. In this way, system load may be taken into account when determining from which queue to select a next job request to admit to the data analytics and/or data storage systems and process.

The classification module 404, in one approach, may be configured to determine the user skill level of the user that submitted the job request 412 based on any number of factors. In one embodiment, the factors may be selected from a group comprising: user experience level, user job request submission history, and corresponding data analytics and/or data storage systems response history to the user job request submission history. In this way, the history of the user's interaction with the data analytics and/or data storage systems 414, particularly the success or failure of each submitted job request, will be used in determining the user skill level in order to more fully ascertain whether a particular current submitted job request will cause the system performance to degrade by attempting to process the job request.

The job dispatcher module 410 is configured to determine from which queue of the plurality of queues 406a, . . . , 406l, a next job request is admitted based on a state of each of the queues relative to one another and a current performance state of the data analytics and/or data storage systems 414. The performance state of the data analytics and/or data storage systems 414 is determined based on an overall workload indicator of the data analytics and/or data storage systems 414 (which may be expressed in a normalized manner to be compared with past and future workload indicators) and/or an aggregate of workload indicators per node of the data analytics and/or data storage systems 414. In another embodiment, a performance state of the data analytics and/or data storage systems 414 may be determined based on a particular node in which a job request is to be processed, and therefore may be based on an individual workload indicator of the particular node on which the job request will be processed.

Furthermore, the job dispatcher module 410 is configured to consider resource availability in making the determination as to whether a job request may be admitted, and from which queue to select the next job request to admit to the data analytics and/or data storage systems 414.

In this way, some balancing across the queues may be performed in choosing from which queue a next job request is admitted to the data analytics and/or data storage systems 414 to be processed. Any conceivable method or algorithm may be used to choose from which queue in the plurality of queues a next job request is selected at any given time, including methods and algorithms that take into account one or more of weighting, load balancing, selecting based strictly on priority, and ordered distributing across the various queues and/or nodes of the data analytics and/or data storage systems 414.

Therefore, the job dispatcher module 410 is configured to admit the job request 412 to the data analytics and/or data storage systems 414 in a specified order with respect to other received job requests based on the queue in which the job request 412 is stored.

In one embodiment, the job dispatcher module 410 may be configured to monitor a set of system resources 416 within the data analytics and/or data storage systems 414. The set of system resources 416 are configured to process admitted job requests in the data analytics and/or data storage systems 414.

Figure 5:
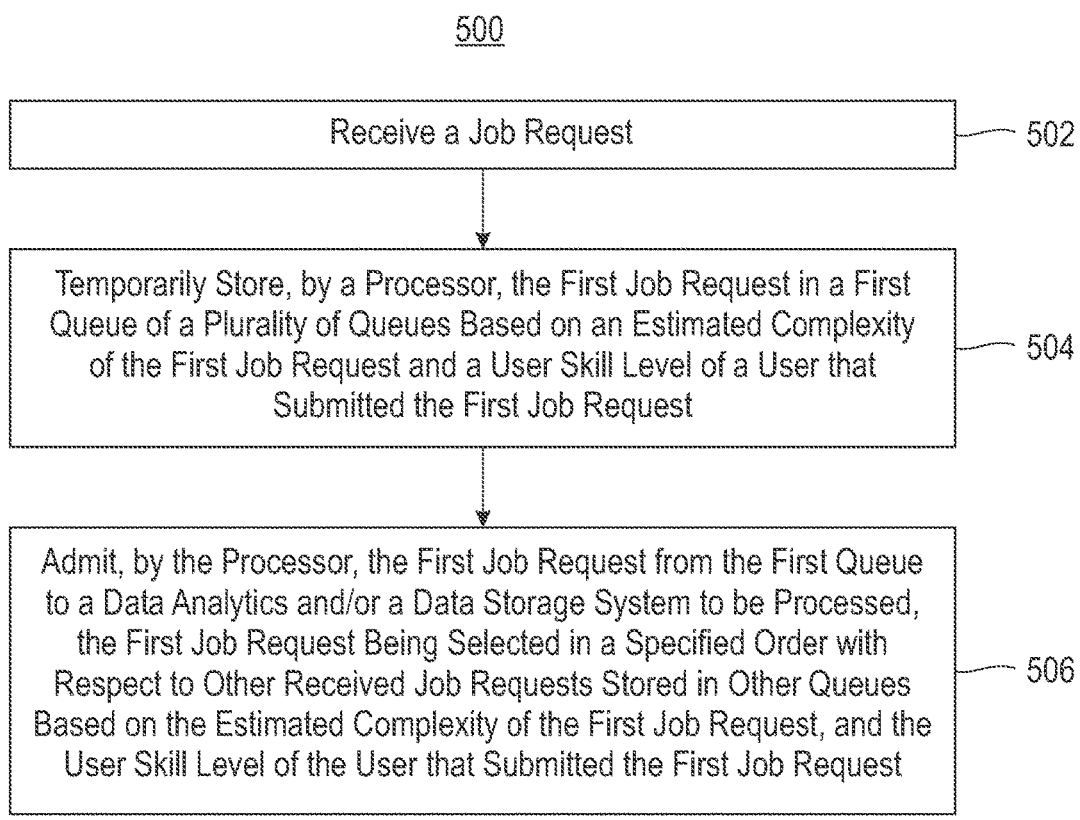
FIG. 5 shows a flowchart of a method, in accordance with one embodiment.

Now referring to FIG. 5, a flowchart of a computer-implemented method 500 for admitting job requests to a data analytics and/or a data storage system is shown according to one embodiment. The method 500 may be performed in accordance with the present invention in any of the environments depicted in FIGS. 1-4, and 6-7, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by processor, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a first job request is received. The job request may specific data, and operation to perform on the data (read, write, delete, etc.), and/or analytics to perform on the data.

In operation 504, the first job request is temporarily stored, by a processor, in a first queue of a plurality of queues based on an estimated complexity of the first job request and a user skill level of a user that submitted the first job request.

The estimated complexity of the first job request and the user skill level of the user that submitted the first job request may be determined using any techniques described herein, or others not specifically described.

In operation 506, the first job request is admitted, by the processor, from the first queue to a data analytics system and/or data storage system to be processed. The first job request is selected in a specified order with respect to other received job requests stored in other queues based on the estimated complexity of the first job request, and the user skill level of the user that submitted the first job request. The estimated complexity is based on one or more attributes of the first job request.

Furthermore, the user skill level may be based on factors selected from the group comprising: user experience level, user job request submission history, and corresponding data analytics system and/or data storage system response history to the user job request submission history.

In another embodiment, method 500 may include determining from which queue of the plurality of queues a next job request is selected to be admitted based on a state of each of the queues relative to one another and a current performance state of the data analytics system and/or data storage system.

In one embodiment, method 500 may include determining the performance state of the data analytics system and/or data storage system based on an overall workload indicator or an aggregate of workload indicators per node. Each queue of the plurality of queues is configured to store job requests having different relative estimated complexities and different user skill levels with respect to job requests stored in other queues.

In one exemplary analytics case, assume that four databases (DBs) exist in a data analytics system and/or data storage system: 1) a Products DB having 100 million (M) rows of data on a consistent basis, 2) a Personal DB having 400M rows of data on a consistent basis, 3) a Coupons DB having 1M rows of data on a consistent basis, and 4) an Orders DB having 500M rows of data per day.

Also assume that the following job requests are submitted from one or more hosts based on the following: SQL, MapReduce, and NoSQL.

The SQL job request is modeled as follows:

```
SELECT * FROM Orders
JOIN (Personal) ON
    Orders .uid = Personal .id
JOIN (Products) ON
    Products. Id = Orders . pid
GROUP BY
    Product. type, Personal .id
```

The MapReduce job request is modeled as follows:

```
Hive -e "select * ...."
Java -cp
    org.apache.mahout.*
```

The NoSQL job request is modeled as follows:

```
var users = db.Personal.find( ); var count = 0;
BasicDBObject u;
while (count < 10)
{
    u = (BasicDBObject) users.next( );
    if (u.getString("order_number") > 100) count = count + 1;
}
```

In each of these exemplary job requests, the job request analyzer module may determine that the job request has a high estimated complexity, due to troublesome code and/or commands contained therein. In the SQL job request, a multi-table join operation is called, which is very resource intensive, and therefore will require relatively more resources than a simpler job request. In the MapReduce job request, the mere call to the MapReduce function is sufficient to alert the job request analyzer module that this job request is of high complexity, as it requires machine learning from a standard library call. In the NoSQL job request, a nested while/if clause is detected, which indicates that an infinite loop may be present, as is easily observable from the code snippet above.

Figure 6:
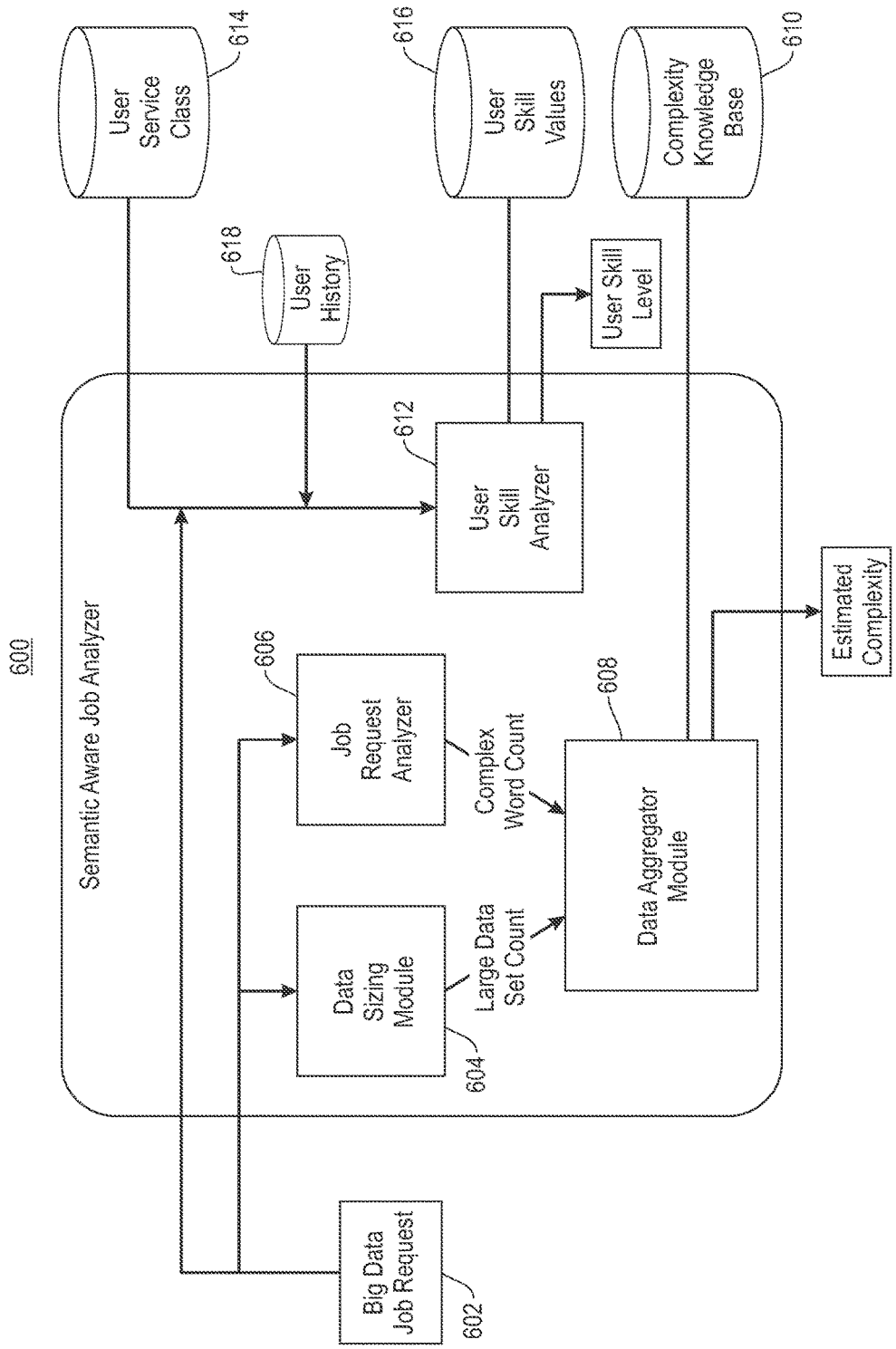
FIG. 6 shows a semantic-aware job analyzer module according to one embodiment.

Now referring to FIG. 6, a semantic-aware job analyzer module 600 is shown according to one embodiment. The semantic-aware job analyzer module 600 comprises a data sizing module 604 configured to determine a size of the data referenced in a job request 602, a job request analyzer 606 configured to perform analytics on the job request to search for one or more patterns in the job request 602 indicative of complex operations, a data aggregator module 608 configured to analyze the results provided by the data sizing module 604 and the job request analyzer 606 in order to produce a normalized estimated complexity, which may be based, at least in part, on information from a complexity knowledge base 610. Furthermore, upon determining the normalized estimated complexity of the job request 602, the data aggregator module 608 may store information to the complexity knowledge base 610 for use in future complexity estimations.

The data aggregator module 608 may be configured to consider multiple metrics and integrate these many metrics in deterministic ways, using a Bayesian network, or according to other probabilistic approaches, as would be understood by one of skill in the art upon reading the present descriptions. The data aggregator module 608 outputs the normalized estimated complexity determined for the job request 602.

The semantic-aware job analyzer module 600 also comprises a user skill analyzer 612 configured to determine a user skill level of the user that submitted the job request 602. This determination may be based on information retrieved from a user service class database 614, a user skill values database 616, and a user history knowledge base 618. The user skill analyzer 612 outputs the user skill determined for the job request 602.

Figure 7:
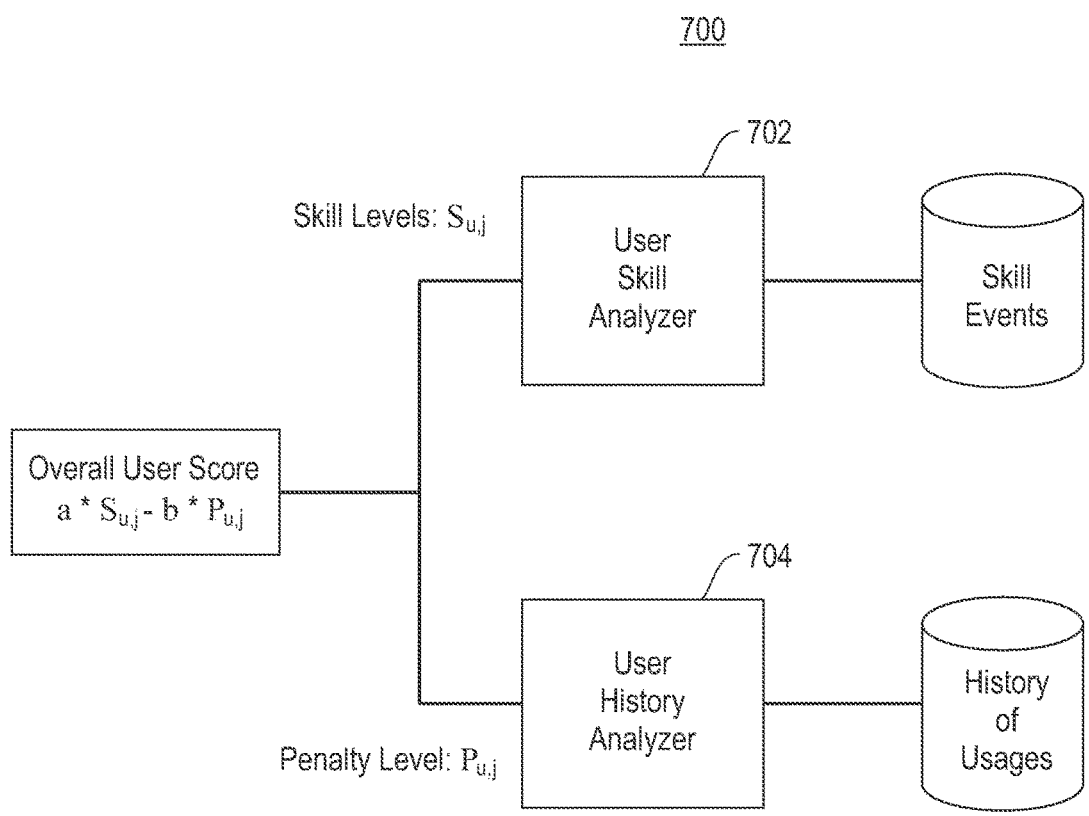
FIG. 7 shows a user analyzer, according to one embodiment.

Now referring to FIG. 7, a user analyzer 700 is shown according to one embodiment. The user analyzer 700 may include a component to analyze user skill 702 and a component to analyze user history 704. The component to analyze user skill 702 may utilize information and/or observations from past skill events over time to determine the skill level of a user that submits a job request. For example, a user may earn a certificate for skill in writing SQL jobs at time t. The component to analyze user history 704 may process observations of actual system resources (e.g., processor, memory, etc.) consumption attributable to jobs submitted by a user. Abnormally high usage at a time t results in an execution penalty, amortized over time. Normal or below average usage results in no penalty being assessed. For example, when a user submits a bad SQL job at time t, a penalty is issued at time t. The user analyzer 700 may track skills and penalties on a per job, per user basis, according to the following tuple <user,job type>. The aggregate historical usage penalty for a user is combined with the user skill level for an overall user rating score at any given time.

An exemplary algorithm for calculating the overall user rating score, assuming a skill level on a per user, per job basis of $S_{u,j}$, and a penalty level on a per user, per job basis of $P_{u,j}$, at any given time t, is as follows: $a*S_{u,j} - b*P_{u,j}$. In this algorithm, coefficients a and b may be set to provide a weighting for the individual values in the algorithm, and may each be set to 1 by default. These coefficients may be altered by a system administrator to effect some change perceived to be necessary to provide better system performance.

The component to analyze user skill 702 may rely on a user's skill credit at time t, C[t], an automatic credit earned from accumulating more experience over time. This may be a credit from certification in a specific skill pertinent to a job request, course completion for a particular skill pertinent to a job request, etc. The user's skill at time t, S[t], may then be calculated with the following algorithm: $S[t]=a*C[t]+b*(w_k*C[t-1]+ \ldots +w_1*C[1])$, with a beta function being used to determine the weights $w_1, \ldots, w_k$, according to one embodiment. An example of one possible beta function is a beta function where rho is about equal to 0.9. In general, rho may be less than one (rho<1) in various approaches. In this way, the skill value of credits decays over time, so more recent credits receive greater weight then older credits.

The component to analyze user history 704 may rely on a historical user job submission outlier event at time instant t, E[t]. This may be earned by submitting a poorly written job request, submitting a very expensive job request, or submitting some other insufficient job request. P[t] is a user's penalty level at time instant t, with an algorithm to calculate P[t] as follows: $P[t]=a*E[t]+b*(w_k*E[t-1]+ \ldots +w_1*E[1])$, with a beta function being used to determine the weights $w_1, w_k$, according to one embodiment. In this way, the impact of outlier events decays over time, so more recent events receive greater weight than older events.

In one embodiment, a computer program product may include a computer-readable storage medium (such as RAM, ROM, non-volatile memory (NVM), etc.) having program instructions embodied therewith. The embodied program instructions are executable by a processor (such as a CPU, FPGA, microprocessor, etc.) to cause the processor to receive, by the processor, a first job request; analyze, by the processor, the first job request to determine: an estimated complexity of the first job request based on one or more attributes of the first job request and a user skill level of a user that submitted the first job request; and admit, by the processor, the first job request to a data analytics system and/or data storage system in a specified order with respect to other received job requests based on at least: the estimated complexity of the first job request, and the user skill level of the user that submitted the first job request. The program instructions may, in an alternate embodiment, be embedded in the processor.

The systems, methods, and computer program products described herein in various embodiments provide many advantages over conventional admission selection systems. some advantages include low-overhead control based on pattern/signature scans, awareness of both job request and user semantics to make more informed decisions, pro-active control before jobs enter the system thus keeping risks of performance degradation due to admitted job requests to a minimum, an original analytics environment is not altered or intruded upon by the admission system, and may be utilized in any conceivable environment for any type of jobs.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product comprising a computer-readable storage medium having program instructions embodied therewith, the embodied program instructions executable by a processor to cause the processor to:
   receive, by the processor, a first job request;
   analyze, by the processor, the first job request to determine a user skill level of a user that submitted the first job request; and
   admit, by the processor, the first job request to a data analytics system and/or a data storage system in a specified order with respect to other received job requests based on at least the user skill level of the user that submitted the first job request.

2. The computer program product as recited in claim 1, wherein the embodied program instructions are executable by the processor to cause the processor to temporarily store, by the processor, the first job request into a first queue of a plurality of queues, the first queue being configured to store job requests having a first range of user skill levels different from those of other queues of the plurality of queues, and wherein the user skill level of the user that submitted the first job request is within the first range.

3. The computer program product as recited in claim 2, wherein the embodied program instructions are executable by the processor to cause the processor to drop, by the processor, a job request that has a lowest dispatch priority with respect to all other job requests in the first queue in response to a determination that the first queue lacks space to store the first job request prior to temporarily storing the first job request into the first queue of the plurality of queues.

4. The computer program product as recited in claim 2, wherein the embodied program instructions are executable by the processor to cause the processor to determine, by the processor, from which queue of the plurality of queues a next job request is admitted based on a state of each of the queues relative to one another and a current performance state of the data analytics system and/or data storage system, wherein the performance state of the data analytics system and/or data storage system is determined based on an overall workload indicator or an aggregate of workload indicators per node.

5. The computer program product as recited in claim 1, wherein the embodied program instructions executable to analyze, by the processor, the first job request comprise program instructions executable to:
analyze, by the processor, the first job request to determine an estimated complexity of the first job request based on one or more attributes of the first job request;
analyze, by the processor, semantics of the first job request to determine a size of the first job request and identify the user that submitted the first job request; and
identify, by the processor, one or more patterns in the first job request, each pattern implying a complex operation within the first job request, and
wherein the embodied program instructions executable by the processor to cause the processor to admit, by the processor, the first job request to the data analytics system and/or data storage system in the specified order with respect to other received job requests is further based on the estimated complexity of the first job request.

6. The computer program product as recited in claim 5, wherein the semantics are selected from the group comprising: keywords in the first job request, a combination of keywords in the first job request, and data set sizes of data sets referenced in the first job request, and wherein the estimated complexity of the first job request is higher when more patterns within the first job request are identified relative to the estimated complexity of the first job request when less or no patterns within the first job request are identified.

7. The computer program product as recited in claim 1, wherein the embodied program instructions are executable by the processor to cause the processor to classify, by the processor, the first job request into a service class based on one or more attributes of the first job request, and wherein the embodied program instructions executable by the processor to cause the processor to admit, by the processor, the first job request to the data analytics system and/or data storage system in the specified order with respect to other received job requests is further based on the service class of the first job request.

8. The computer program product as recited in claim 7, wherein the embodied program instructions are executable by the processor to cause the processor to:
temporarily store, by the processor, all received job requests into one of a plurality of queues, each queue being configured to store job requests having different service classes and user skill levels with respect to job requests stored in other queues; and
monitor, by the processor, a set of system resources configured to process admitted job requests in the data analytics system and/or data storage system.

9. The computer program product as recited in claim 8, wherein each queue represents a dispatch priority and corresponds to one or more tuples having the following dimensions: service class of the job request and user skill level.

10. The computer program product as recited in claim 1, wherein the embodied program instructions executable by the processor to analyze, by the processor, the first job request to determine the user skill level of the user that submitted the first job request determines the user skill level based on factors selected from the group comprising: user experience level, user job request submission history, and corresponding data analytics system and/or data storage system response history to the user job request submission history.

11. A computer-implemented method, comprising:
receiving a first job request;
analyzing the first job request to determine a user skill level of a user that submitted the first job request; and
admitting the first job request to a data analytics system and/or a data storage system in a specified order with respect to other received job requests based on at least the user skill level of the user that submitted the first job request.

12. The method as recited in claim 11, further comprising temporarily storing the first job request into a first queue of a plurality of queues, the first queue being configured to store job requests having a first range of user skill levels different from those of other queues of the plurality of queues, and wherein the user skill level of the user that submitted the first job request is within the first range.

13. The method as recited in claim 12, further comprising dropping a job request that has a lowest dispatch priority with respect to all other job requests in the first queue in response to a determination that the first queue lacks space to store the first job request prior to temporarily storing the first job request into the first queue of the plurality of queues.

14. The method as recited in claim 12, further comprising determining from which queue of the plurality of queues a next job request is admitted based on a state of each of the queues relative to one another and a current performance state of the data analytics system and/or data storage system, wherein the performance state of the data analytics system and/or data storage system is determined based on an overall workload indicator or an aggregate of workload indicators per node.

15. The method as recited in claim 11, wherein the analyzing the first job request further comprises:
analyzing the first job request to determine an estimated complexity of the first job request based on one or more attributes of the first job request;
analyzing semantics of the first job request to determine a size of the first job request and identify the user that submitted the first job request; and
identifying one or more patterns in the first job request, each pattern implying a complex operation within the first job request,
wherein the admitting the first job request to the data analytics system and/or data storage system in the specified order with respect to other received job requests is further based on the estimated complexity of the first job request, and wherein the semantics are selected from the group comprising: keywords in the first job request, a combination of keywords in the first job request, and data set sizes of data sets referenced in the first job request, and wherein the estimated complexity of the first job request is higher when more patterns within the first job request are identified relative to the estimated complexity of the first job request when less or no patterns within the first job request are identified.

16. The method as recited in claim 11, further comprising classifying the first job request into a service class based on one or more attributes of the first job request, and wherein the admitting the first job request to the data analytics system and/or data storage system in the specified order with respect to other received job requests is further based on the service class of the first job request.

17. The method as recited in claim 16, further comprising:
temporarily storing all received job requests into one of a plurality of queues, each queue being configured to store job requests having different service classes and user skill levels with respect to job requests stored in other queues; and
monitoring a set of system resources configured to process admitted job requests in the data analytics system and/or data storage system, and
wherein each queue represents a dispatch priority and corresponds to one or more tuples having the following dimensions: service class of the job request and user skill level.

18. The method as recited in claim 11, wherein the analyzing the first job request to determine the user skill level of the user that submitted the first job request determines the user skill level based on factors selected from the group comprising: user experience level, user job request submission history, and corresponding data analytics system and/or data storage system response history to the user job request submission history.

19. A system, comprising:
one or more hardware processors;
a computer-readable storage medium having software modules embodied therewith that are executable by the one or more hardware processors, the software modules comprising:
a job request analyzer module configured to analyze a job request to determine a user skill level of a user that submitted the job request; and
a job dispatcher module configured to admit the job request to a data analytics system and/or a data storage system in a specified order with respect to other received job requests based on the user skill level of the user that submitted the job request.

20. The system as recited in claim 19, wherein the job request analyzer module is further configured to analyze the job request to determine an estimated complexity of the job request based on one or more attributes of the job request;
analyze semantics of the job request to determine a size of the job request and identify the user that submitted the job request; and
identify one or more patterns in the job request, each pattern implying a complex operation within the job request,
wherein the semantics are selected from the group comprising: keywords in the job request, a combination of keywords in the job request, and data set sizes of data sets referenced in the job request, and
wherein the estimated complexity of the job request is higher when more patterns within the job request are identified relative to the estimated complexity of the job request when less or no patterns within the job request are identified.

* * * * *